United States Patent
Brisebois et al.

(10) Patent No.: US 10,425,838 B2
(45) Date of Patent: *Sep. 24, 2019

(54) FEMTOCELL MEASUREMENTS FOR MACRO BEAM STEERING

(71) Applicant: AT&T Mobility II LLC, Atlanta, GA (US)

(72) Inventors: Arthur Brisebois, Cumming, GA (US); Mark Causey, Tucker, GA (US); Adrianne Luu, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,300

(22) Filed: May 18, 2018

(65) Prior Publication Data

US 2018/0270857 A1    Sep. 20, 2018

Related U.S. Application Data

(63) Continuation of application No. 15/453,841, filed on Mar. 8, 2017, now Pat. No. 9,980,285, which is a
(Continued)

(51) Int. Cl.
*H04W 16/28* (2009.01)
*H04W 24/02* (2009.01)
(Continued)

(52) U.S. Cl.
CPC .......... *H04W 16/28* (2013.01); *H04B 7/0617* (2013.01); *H04B 17/318* (2015.01);
(Continued)

(58) Field of Classification Search
CPC ..... H04W 16/28; H04W 74/04; H04W 24/10; H04W 8/22; H04W 24/02; H04W 84/045; H04B 17/318; H04B 7/0617
See application file for complete search history.

(56) References Cited

U.S. PATENT DOCUMENTS 6,477,367 B1  11/2002  Kim
6,594,496 B2  7/2003  Schwartz
(Continued)

OTHER PUBLICATIONS

Iskander, et al., "Antenna Array Designs with Advanced Beam Steering Capabilities". http://www.ursi.org/proceedings/procGA08/papers/B04p1.pdf. URSI General Assembly held Aug. 7-16, 2008 in Chicago. Last accessed Feb. 14, 2014. 4 pages.
(Continued)

*Primary Examiner* — Sharad Rampuria
(74) *Attorney, Agent, or Firm* — Amin, Turocy & Watson, LLP

(57) ABSTRACT

Attachment data collected by a set of femto access points (FAPs) is utilized to localize, predict, and/or weight potential wireless communication traffic within and between areas. Moreover, the attachment data can be indicative of user equipment (UE) density/traffic within coverage areas of respective femtocells. The attachment data can be consolidated and analyzed to identify location and motion of a UE "swarm". Moreover, an automatic cell planning (ACP) component can be employed to utilize the attachment data for determining an optimal macro site and optimal antenna setting(s) that facilitate steering/tuning the macro antenna beam to focus upon the swarm area. In addition, the ACP component can facilitate reconfiguration of the macro antenna beam as reported swarm concentrations shift between the FAPs.

20 Claims, 13 Drawing Sheets

Related U.S. Application Data continuation of application No. 15/130,898, filed on Apr. 15, 2016, now Pat. No. 9,596,612, which is a continuation of application No. 14/264,749, filed on Apr. 29, 2014, now Pat. No. 9,319,890, which is a continuation of application No. 13/272,273, filed on Oct. 13, 2011, now Pat. No. 8,750,896.

(51) Int. Cl.
| | |
|---|---|
| *H04W 8/22* | (2009.01) |
| *H04W 24/10* | (2009.01) |
| *H04B 17/318* | (2015.01) |
| *H04B 7/06* | (2006.01) |
| *H04W 74/04* | (2009.01) |
| *H04W 84/04* | (2009.01) |

(52) U.S. Cl.
CPC ............ *H04W 8/22* (2013.01); *H04W 24/02* (2013.01); *H04W 24/10* (2013.01); *H04W 74/04* (2013.01); *H04W 84/045* (2013.01)

(56) References Cited

U.S. PATENT DOCUMENTS

| | | | |
|---|---|---|---|
| 6,950,678 | B1 | 9/2005 | Mujtaba et al. |
| 7,903,625 | B1 | 3/2011 | Srinivas et al. |
| 7,929,970 | B1 | 4/2011 | Gunasekara et al. |
| 7,986,973 | B2 | 7/2011 | Rhodes et al. |
| 8,412,221 | B2 | 4/2013 | Fan et al. |
| 8,498,207 | B2 | 7/2013 | Trigui et al. |
| 8,509,166 | B2 | 8/2013 | Kerpez et al. |
| 8,538,435 | B2 | 9/2013 | Immendorf et al. |
| 8,543,112 | B2 | 9/2013 | Fox et al. |
| 8,588,698 | B2 * | 11/2013 | Brisebois ............ H04W 88/06 455/63.1 |
| 8,589,541 | B2 | 11/2013 | Raleigh et al. |
| 8,724,467 | B2 | 5/2014 | Le Faucheur et al. |
| 8,725,158 | B2 | 5/2014 | Campos et al. |
| 8,743,776 | B2 * | 6/2014 | Gurajala ............ G06Q 30/016 370/328 |
| 8,750,896 | B2 | 6/2014 | Brisebois et al. |
| 8,831,679 | B2 | 9/2014 | Bajj et al. |
| 9,166,732 | B2 | 10/2015 | Causey et al. |
| 9,693,326 | B2 | 6/2017 | Lorca Hernando |
| 9,980,285 | B2 * | 5/2018 | Brisebois ............ H04W 16/28 |
| 10,057,785 | B2 * | 8/2018 | Kwak ............ H04L 27/26 |
| 2009/0023477 | A1 | 1/2009 | Staudte |
| 2009/0296635 | A1 | 12/2009 | Hui et al. |
| 2010/0136996 | A1 | 6/2010 | Han et al. |
| 2010/0210290 | A1 | 8/2010 | Riley et al. |
| 2011/0287775 | A1 | 11/2011 | Fan et al. |
| 2013/0028107 | A1 | 1/2013 | Ho et al. |
| 2013/0114434 | A1 | 5/2013 | Muruganathan et al. |
| 2013/0272132 | A1 | 10/2013 | Heo et al. |
| 2013/0303218 | A1 | 11/2013 | Teller |
| 2014/0036656 | A1 | 2/2014 | Chou et al. |
| 2014/0146681 | A1 | 5/2014 | Gusavec et al. |
| 2014/0147125 | A1 | 5/2014 | Chow |
| 2016/0050265 | A1 | 2/2016 | Botticelli |

OTHER PUBLICATIONS

Mentum Cell Planner, http://www.mentum.com/index.php?page=cellplanner&hl=en_US. Last accessed Dec. 30, 2011, 1 page.

"What is Mentum Planet?" published online at [http://www.mentum.com/index.php?page=mentum-planet&hl=en_US] archived version dated Nov. 19, 2011, retrieved from Wayback Machine on Feb. 11, 2015, 3 pages.

CellPlanner, http://www.celplan.com/Products/CP.asp?Plan=true. Last accessed Dec. 30, 2011, 1 page.

Broadband-eQ Network Planning Software, http://www.equilateral.com/broadband.html#optimization. Last accessed Dec. 30, 2011, 2 pages.

Equilateral Technologies, "Wireless Network Planning and Optimization—RF Propagation Prediction", http://www.equilateral.com/broadband.html#optimization, last accessed Mar. 2, 2012.

Non-Final Office Action for U.S. Appl. No. 13/312,858, dated Jul. 12, 2012, 29 pages.

Office Action dated Mar. 18, 2013 for U.S. Appl. No. 13/312,858, 22 pages.

Office Action dated Aug. 1, 2013 for U.S. Appl. No. 13/312,858, 25 pages.

Non-Final Office Action for U.S. Appl. No. 13/272,273, dated Oct. 23, 2013, 38 pages.

Chiao, et al., "MEMS Reconfigurable Vee Antenna," 1999 IEEE MTT-S Digest, retrieved Oct. 23, 2013, pp. 1515-1517.

Office Action dated Dec. 30, 2013 for U.S. Appl. No. 13/222,555, 25 pages.

Office Action dated Dec. 19, 2013 for U.S. Appl. No. 13/312,858, 25 pages.

Notice of Allowance dated Jan. 30, 2014 for U.S. Appl. No. 13/272,273, 29 pages.

Li, et al., "Real Time Radio Coverage Monitoring in Selforganizing Networks with User Feedback". 2012 IEEE Fifth International Workshop on Selected Topics in Mobile and Wireless Computing. Oct. 2012, 8 pages.

Akyildiz, et al., "Next generation/dynamic spectrum access/cognitive radio wireless networks: A survey". Computer Networks 50 (2006) 2127-2159. www.elseviercom/locate/comnet. Retrieved on Sep. 16, 2014, 33 pages.

Office Action dated Aug. 25, 2015 for U.S. Appl. No. 14/264,749, 22 pages.

Notice of Allowance dated Dec. 17, 2015 for U.S. Appl. No. 14/264,749, 15 pages.

Notice of Allowance dated Jan. 6, 2016 for U.S. Appl. No. 14/329,732, 33 pages.

Non-Final Office Action for U.S. Appl. No. 14/530,522 dated Jun. 23, 2016, 29 pages.

Notice of Allowance dated Nov. 2, 2016 for U.S. Appl. No. 15/130,898. 26 pages.

Office Action dated Nov. 7, 2016 for U.S. Appl. No. 15/136,861. 38 pages.

Office Action dated Feb. 23, 2017 for U.S. Appl. No. 14/530,522, 23 pages.

Office Action dated Jun. 29, 2017 for U.S. Appl. No. 14/530,522, 24 pages.

Final Office Action dated Aug. 23, 2017 for U.S. Appl. No. 15/136,861, 26 pages.

Final Office Action dated Dec. 28, 2017 for U.S. Appl. No. 14/530,522, 27 pages.

Notice of Allowance dated Jan. 19, 2018 for U.S. Appl. No. 15/453,841, 46 pages.

Office Action dated May 17, 2018 for U.S. Appl. No. 14/530,522, 34 pages.

Office Action dated Nov. 28, 2018 for U.S. Appl. No. 14/530,522, 50 pages.

Non-Final Office Action received for U.S. Appl. No. 14/530,522 dated Apr. 24, 2019, 95 pages.

\* cited by examiner

FEMTOCELL MEASUREMENTS FOR MACRO BEAM STEERING

CROSS-REFERENCE TO RELATED APPLICATIONS

The subject application is a continuation of, and claims priority to each of, U.S. patent application Ser. No. 15/453,841, entitled "FEMTOCELL MEASUREMENTS FOR MACRO BEAM STEERING," and filed on Mar. 8, 2017, which is a continuation of U.S. patent application Ser. No. 15/130,898, entitled "FEMTOCELL MEASUREMENTS FOR MACRO BEAM STEERING," and filed on Apr. 15, 2016 (now U.S. Pat. No. 9,596,612, issued on Mar. 14, 2017), which is a continuation of U.S. patent application Ser. No. 14/264,749, entitled "FEMTOCELL MEASUREMENTS FOR MACRO BEAM STEERING," and filed on Apr. 29, 2014 (now U.S. Pat. No. 9,319,890, issued on Apr. 19, 2016), which is a continuation of U.S. patent application Ser. No. 13/272,273, entitled "FEMTOCELL MEASUREMENTS FOR MACRO BEAM STEERING," and filed on Oct. 13, 2011 (now U.S. Pat. No. 8,750,896, issued on Jun. 10, 2014). The entireties of each of the aforementioned applications are incorporated herein by reference.

TECHNICAL FIELD

The subject disclosure relates to wireless communications, for example, to a mechanism that employs measurements, collected at a femtocell, to facilitate macro beam steering.

BACKGROUND

Wireless service providers are observing an exponential growth in mobile communications due to both an increase in consumer demand and commercial requirements. Moreover, to ensure customer satisfaction, wireless service providers aim to deliver a high quality service at any location, to facilitate reliable and efficient mobile communications. However, wireless data usage has become difficult to predict and localize and it is often difficult to tune the wireless network to suit this usage. This is especially evident in venues where large "swarms" of users may congregate and move between locations, which are or are not served well by the macro and/or indoor networks. Indoor networks are complex, expensive, location-specific and static. Moreover, indoor networks are effective only if the users swarm/congregate near the antennas, but have no means to adapt to moving swarms. It is also difficult, costly, and time-consuming to implement indoor networks in every location susceptible to swarms of users. In cases where swarms are driven by infrequent or random events, it is difficult to predict and justify return on investment for indoor networks. Additionally, it is difficult to adequately predict and provision capacity, before the swarm actually occurs.

Conventional systems also utilize global positioning system (GPS) data, received from user equipments (UEs), indicative of UE locations, to detect swarms. However, this approach negatively affects battery life of the UEs. In addition, this approach requires network resources to report UE location data. Moreover, if a UE, in a swarm, cannot acquire radio resources to report the GPS data, the swarm cannot be detected in time by the network. Further, GPS signals are also difficult to acquire indoors, where swarms are most likely to occur. In another example, smart-antennas can be utilized in macro cells to potentially localize and tune themselves to better serve swarms of users. However, smart-antennas are highly complex, expensive and large. In addition, smart-antennas only react to in-progress traffic (e.g., after a UE establishes voice/data communication) and are unable to predict or improve idle-mode (e.g., before a UE establishes voice/data communication) signal strength or perception.

DETAILED DESCRIPTION

Figure 1:
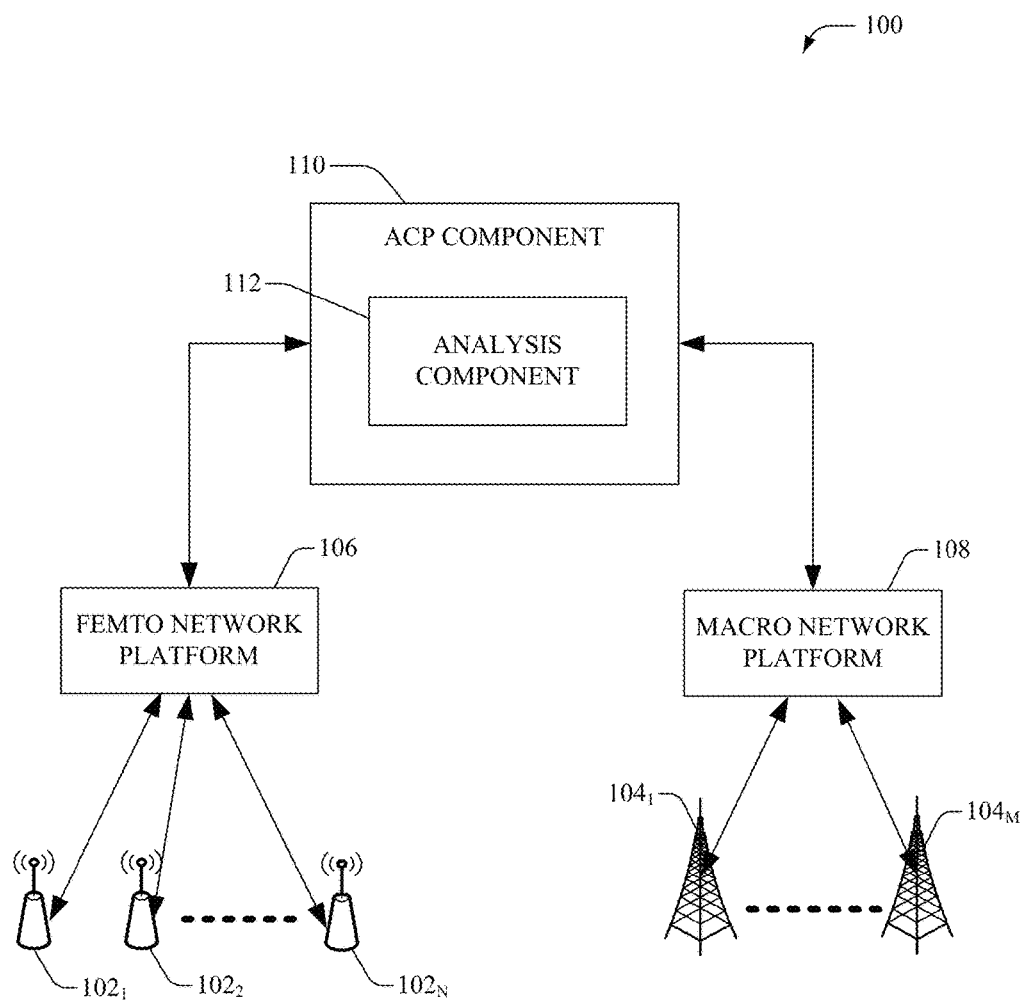
FIG. 1 illustrates an example system that can facilitate improved macro network coverage for areas with a high density of users.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile device," "mobile," "subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", and "femto" are utilized interchangeably, while "macro cell" and "macro" are utilized interchangeably herein.

The systems and methods disclosed herein, in one aspect thereof, can locate and better serve areas of high user density (swarms), based on femto attachment attempt reports and dynamic macro network beam steering. Femto access points (FAPs) can detect a high concentration of users attempting connection to femto networks, and can forward pertinent information to an automatic cell planning tool. The automatic cell planning tool can identify a swarm location, and implement macro network beam steering changes to improve macro coverage at the swarm location and better serve the users within the swarm.

Another aspect of the disclosed subject matter relates to a method that can be employed to facilitate macro antenna tuning based on femto attachment attempt data. In particular, the method can include receiving the femto attachment attempt data, which is indicative of a user density within a femtocell coverage area, and aggregating, consolidating, and/or analyzing the received data. Based on the analysis, a FAP with the highest user equipment (UE) density can be identified. Further, the method can include determining and updating one or more parameters (e.g., antenna bearing and/or tilt) for steering and/or tuning antenna(s) at a macro access point, in a direction towards the identified FAP. Moreover, the antenna(s) can be reconfigured as reported user concentrations move between FAPs.

The systems and methods disclosed herein provide a means to improve macro network coverage, by dynamic beam steering/tuning to better serve areas of high user density (swarm) and adapt to moving user equipment (UE) swarms. In contrast to conventional systems, the systems and methods disclosed herein can detect and/or locate swarms of users based on real-time attachment measurements from femtocells and dynamically implement macro network beam steering changes to focus upon the swarm area(s). Moreover, the process disclosed herein, can be updated, each time a femtocell reports user density changes, and thus efficiently and accurately adapt to moving swarms.

Aspects or features of the subject specification can be exploited in substantially any wireless communication technology; e.g., Wi-Fi, global system for mobile communications (GSM), universal mobile telecommunications system (UMTS), worldwide interoperability for microwave access (WiMAX), enhanced general packet radio service (Enhanced GPRS), third generation partnership project (3GPP) long term evolution (LTE), third generation partnership project 2 (3GPP2) ultra mobile broadband (UMB), high speed packet access (HSPA), Zigbee or another IEEE 802.XX technology. Additionally, substantially all aspects of the subject specification can be exploited in legacy telecommunication technologies.

Referring initially to FIG. 1, there illustrated is an example system 100 that can facilitate improved macro network coverage for areas with a high density of users, according to an aspect of the subject specification. The system 100 utilizes measurement(s) received from one or more femto access points (FAPS) (102$_1$-102$_N$) to identify a location of and/or motion of a "swarm". A "swarm" can be a large group, crowd, or high density of user equipment (UE) temporarily gathered or congregated at a location, area, or venue. In one example, swarms can be driven or trigged by events, for example, scheduled events, such as, but not limited to, social gathering(s), meeting(s), convention(s), concert(s), flash mob(s), political rallies, demonstration(s) or protest (s), parade(s), carnival(s) or fair(s), farmers market(s), marathon(s) or similar charity event(s), and/or infrequent and/or unplanned events, such as, but not limited to evacuations, natural disasters, or weather conditions. In addition, swarms can include collection of user(s) in response to a trigger, such as, but not limited to, a promotion or sale at a store, a delay in traffic (e.g., due to an accident), release of a new item in a store or a new movie/play in a theatre, etc. Further, swarms can move from one area to another. For example, a swarm of users can be located outside a stadium before a game (e.g., during a tailgating party), and can move inside the stadium once the game has started. In another example, during a race, swarms can move from a starting line to a finish line, and/or during a golf tournament, swarms can move from one hole to the next.

According to an embodiment, a number (N; wherein N can be an integer) of FAPs ($102_1$-$102_N$) can be deployed within the wireless service provider's network. FAPs ($102_1$-$102_N$) are building-based wireless access points interfaced with a wired broadband network, that can be deployed to improve indoor wireless coverage, and to offload traffic from a mobility radio access network (RAN) operated by a wireless service provider. Improved indoor coverage includes stronger signal, increased bandwidth, and improved reception (e.g., video, sound, or data), ease of session or call initiation, and session or call retention, as well. Offloading traffic from the RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

In one aspect, one or more of the FAPs ($102_1$-$102_N$) can determine a number of attachment attempts, made by UEs within their respective femtocell coverage areas. As an example, the UEs can be whitelisted, blacklisted and/or not be associated with access control lists of the FAPs ($102_1$-$102_N$). In one example, the one or more of the FAPs ($102_1$-$102_N$) can provide this number of attachment attempts, to an automatic cell planning component (ACP) 110, via a femto network platform 106. In another example, the one or more of the FAPs ($102_1$-$102_N$) can notify the ACP component 110, only when the number of attachment attempts is greater than a predefined threshold indicative of a swarm. In one embodiment, the ACP component 110 can include an analysis component 112, which can aggregate and analyze the measurements and/or notifications received from the FAPs ($102_1$-$102_N$). Moreover, the analysis component 112 can utilize the measurement and/or notification data to identify areas with a high density of UEs. As an example, the analysis component 112 can identify a location of FAP that reports the highest number of attachment attempts within a specific period of time. Accordingly, the analysis component 112 can determine one or more macro access points, for example, base stations ($104_1$-$104_M$; where M can be any integer) located near the identified location, and the ACP component 110 can provide instructions to the base stations ($104_1$-$104_M$), for dynamic beam steering, via a macro network platform 108.

In one example, base stations ($104_1$-$104_M$) can be most any cell sites, for example, locations at which antennas (e.g., transmitter/receivers, transceivers) and electronic communications equipment are placed. As an example, a cell site can typically include communications equipment to create a cell in a cellular network. The communications equipment can include an access point, a Node B, an evolved Node B, or the like. Moreover, on receiving instructions from the ACP component 110, the base stations ($104_1$-$104_M$) can re-direct or steer one or more antennas towards the swarm location. As an example, beam steering can include switching one or more antenna elements or by changing the relative phases of the radio frequency (RF) signals driving the one or more elements. In addition, other transmission parameters, such as, but not limited to, the transmission power of the one or more antennas of base stations ($104_1$-$104_M$) can be modified to improve macro coverage at the swarm location. Although the ACP component 110 is illustrated to be externally coupled to the femto network platform 106 and the macro network platform 108, it can be appreciated that the ACP component 110 can reside within the femto network platform 106 or the macro network platform 108, or be distributed between the femto network platform 106 and the macro network platform 108.

Figure 2:
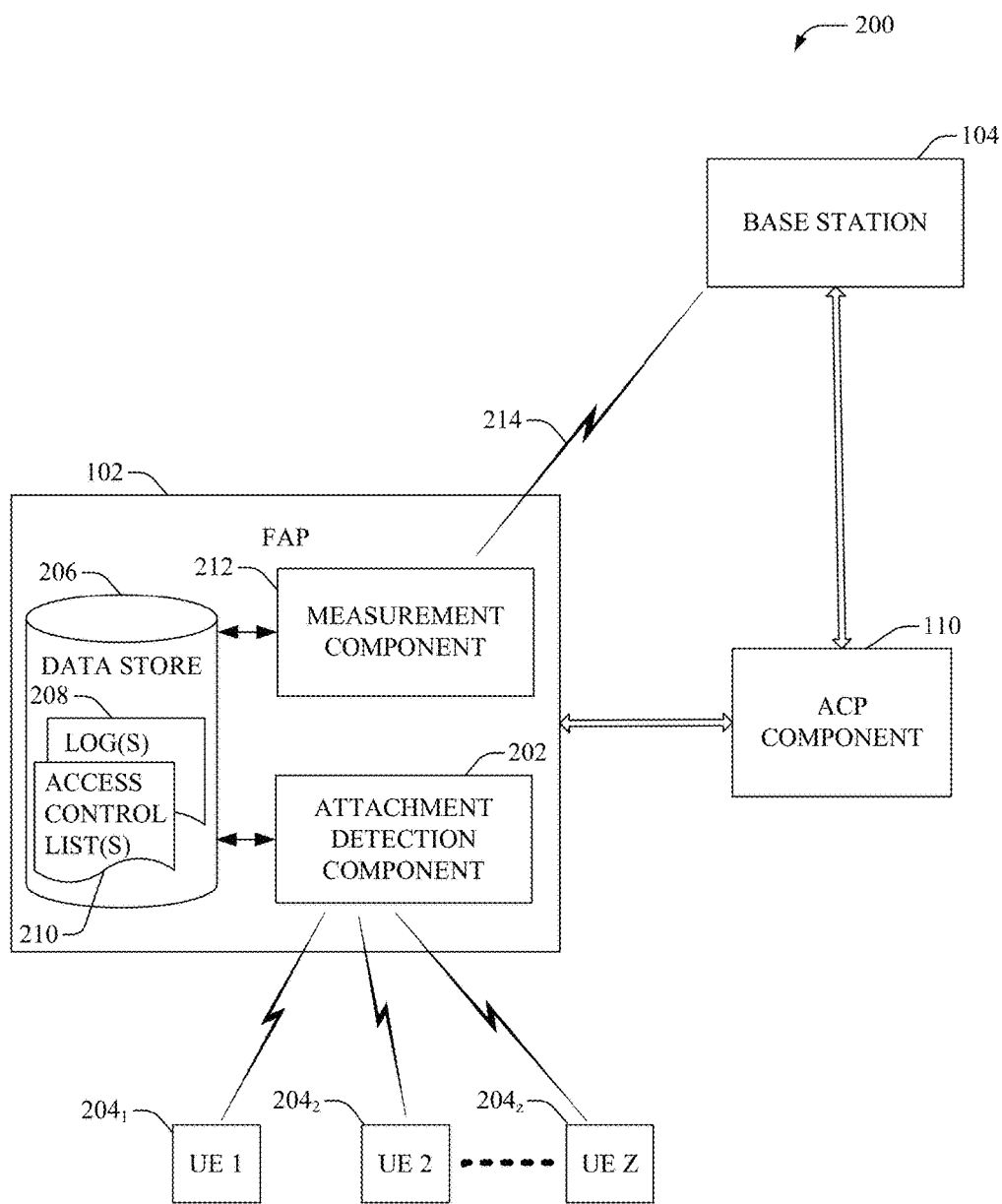
FIG. 2 illustrates an example system that can be employed for real-time detection of user equipment (UE) swarms.

Referring now to FIG. 2, there illustrated is an example system 200 for real-time detection of UE swarms in accordance with an aspect of the subject disclosure. The system 200 can include a wireless communication network (e.g., cellular macro network) served by a base station 104. Moreover, base station 104 can provide macro coverage that is generally intended for servicing wireless mobile devices. To improve indoor wireless coverage, and/or to offload the mobility radio access network (RAN), femtocells, such as, a femtocell, served by a FAP 102, can be deployed within system 200. It can be appreciated that services provided by the femtocell can be extended beyond indoor coverage enhancement; for example, the femtocell can be utilized in areas wherein macro coverage is not poor or weak. Typically, the femtocell can cover an area that can be determined, at least in part, by transmission power allocated to FAP 102, path loss, shadowing, and so forth. The FAP 102 can facilitate communication between authorized user equipment within a femtocell coverage area and a service provider's core network. In particular, the communication (e.g., voice and/or data traffic) between the FAP 102 and the core network is routed through a backhaul broadband wired network, for example, an optical fiber backbone, twisted-pair line, T1/E1 phone line, Digital Subscriber Cable (DSL), coaxial cable, and/or the like. It can be appreciated that the FAP 102 can be substantially similar to FAPs ($102_1$-$102_N$), and base station 104 can be substantially similar to base stations ($104_1$-$104_M$). Further, the ACP component 110 can include functionality, as more fully described herein, for example, with regard to system 100.

In one embodiment, traffic at the femtocell can be determined by an attachment detection component 202. Moreover, the attachment detection component 202 can identify attachment attempts made by UEs ($204_1$-$204_Z$; where Z can be any integer value) within the femtocell to connect to the FAP 102. The volume of attachment attempts (e.g., for a specific time period, such as but not limited to, within a few minutes, an hour, a day, a week, etc.) can be used to locate and determine periods of high traffic at a location at which the FAP 102 is deployed. In other words, attachment attempts can occur more often in dense user areas and less often in isolated areas. The frequency and movement of attach attempts can therefore be an indicator of nearby (e.g., within the relatively small radius of the FAP 102) user density and/or migration. Moreover, the volume of attach attempts can be used to localize, predict and weight the potential wireless communication traffic within and between venues.

As an example, UEs ($204_1$-$204_Z$) can include most any electronic communication devices such as, but not limited to, most any consumer electronic devices, for example, a digital media player, a digital photo frame, a digital camera, a cellular phone, a personal computer, a tablet computer, a personal digital assistant (PDA), a smart phone, a laptop, a gaming system, etc. Further, UEs ($204_1$-$204_Z$) can also include LTE-based devices, such as, but not limited to, most any home or commercial appliance that includes an LTE radio. It can be appreciated that the UEs ($204_1$-$204_Z$) can be mobile, have limited mobility and/or be stationary.

According to an aspect, the attachment detection component 202 can compute and/or record a total number of attachment attempts, a number of attachment attempts made by whitelisted UEs, a number of attachment attempts made by blacklisted UEs, and/or a number of attachment attempts made by visitor UEs (e.g., UEs that are not included on an access control list 210 associated with the FAP 102). As an example, access control list 210 can be stored within data store 206 and/or retrieved/accessed from a network database (not shown). The access control list 210 can provide functionality to authorize, permanently or temporarily, or deny or revoke access to specific subscribers, or UEs, and can include white list(s) or black list(s). Moreover, the attachment detection component 202 can utilize data from the access control list 210 to calculate the number of attachment attempts made by whitelisted UEs, the number of attachment attempts made by blacklisted UEs, and/or the number of attachment attempts made by visitor UEs. Additionally, or alternatively, the attachment detection component 202 can also identify a number of attachment attempts made by unique UEs based on an identifier, such as, but not limited to an International Mobile Subscriber Identity (IMSI), an International Mobile Equipment Identity (IMEI), a Mobile Station International Subscriber Directory Number (MSISDN), Subscriber Identity Module (SIM), or a serial number of a UE.

In one aspect, the attachment detection component 202 can provide the data relating to the number of attachment attempts (e.g., total, by whitelisted/blacklisted or visitor UEs) to the ACP component 110 (e.g., over the backhaul broadband wired network). In one example, the ACP component 110 can reside within or be distributed between a femto network platform, macro network platform and/or core network node. The ACP component 110 can assign a higher weighting contribution to a FAP with more attachment attempts, than a FAP with less attachment attempts. This weighting can ensure that automatic antenna tuning algorithms benefit the highest concentrations of users. In another aspect, the attachment detection component 202 can compare the total number of attachment attempts, the number of attachment attempts made by whitelisted UEs, the number of attachment attempts made by blacklisted UEs, and/or the number of attachment attempts made by visitor UEs, with their respective predefined thresholds. As an example, the predefined thresholds can be indicative of a number, beyond which, the number of UEs in a femtocell coverage area is considered a user swarm or high user density. Moreover, the attachment attempt data can be delivered to the ACP component 110, by the attachment detection component 202, in response to one or more of the predefined thresholds being exceeded.

The ACP component 110 receives attachment attempt data from FAP 102 and can determine location of a swarm based on an analysis of the attachment attempt data (e.g., by employing analysis component 112). Although only one FAP, FAP 102, is illustrated, it can be appreciated that the ACP component 110 can collect, aggregate and/or weigh attachment attempt data measured by multiple FAPs deployed within the service provider's network. Moreover, the ACP component 110 can access, determine, or obtain, a geographical location of the FAP 102 to locate the area of the swarm. As an example, the location of the FAP 102 is known at the time of activation, for example, based on global positioning system (GPS) co-ordinates or user input. Further, the ACP component 110 can identify base station(s) nearest to the location of the FAP 102, such as base station 104 and instruct the base station 104 to steer its antenna in a direction towards the concentration of UEs (e.g., location of FAP 102). In one example, the ACP component 110 can instruct the base station 104 to modify the phase and/or relative amplitude of a signal transmitted at each transmitter of its antenna(s). In another example, the ACP component 110 can instruct the base station 104 to modify an antenna bearing and/or tilt suited for the highest user concentration locations reported by FAP 102. Accordingly, the base station 104 can implement the requested modifications.

Further, the FAP 102 can include a measurement component 212, which can monitor, sense, and/or measure a radio environment associated with one or more macro cells surrounding the FAP 102. For example, the measurement component 212 can perform a network listen procedure and obtain measurements 214 for detecting signal strength(s) and/or downlink rate of signal(s) of the surrounding base station(s). In one example, the measurement component 212 can identify macro base station(s) providing the strongest signal and provide this data to the ACP component 110 to facilitate dynamic macro beam steering at the macro base station(s). In another example, the measurement component 212 can compare signal strengths of transmissions from the surrounding base station(s) with a predefined threshold, and select a set of the base station(s), that provide transmissions exceeding the predefined threshold. Additionally, or alternatively, the measurement component 212 can detect an increase in signal strength after reporting a swarm condition, and accordingly provide feedback to the ACP component 110. According to an embodiment, authorization can be requested from a femtocell subscriber or owner prior to reporting data to the ACP component 110 and/or measuring the radio environment.

In one embodiment, the attachment attempt data and/or measurement data collected by the attachment detection component 202 and the measurement component 212 respectively, can be logged (208) within data store 206. Although data store 206 is depicted to reside within the FAP 102, it can be appreciated that the data store 206 can be locally or remotely coupled to FAP 102. It can be appreciated that the data store 206 can include volatile memory(s) or nonvolatile memory(s), or can include both volatile and nonvolatile memory(s). By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 3:
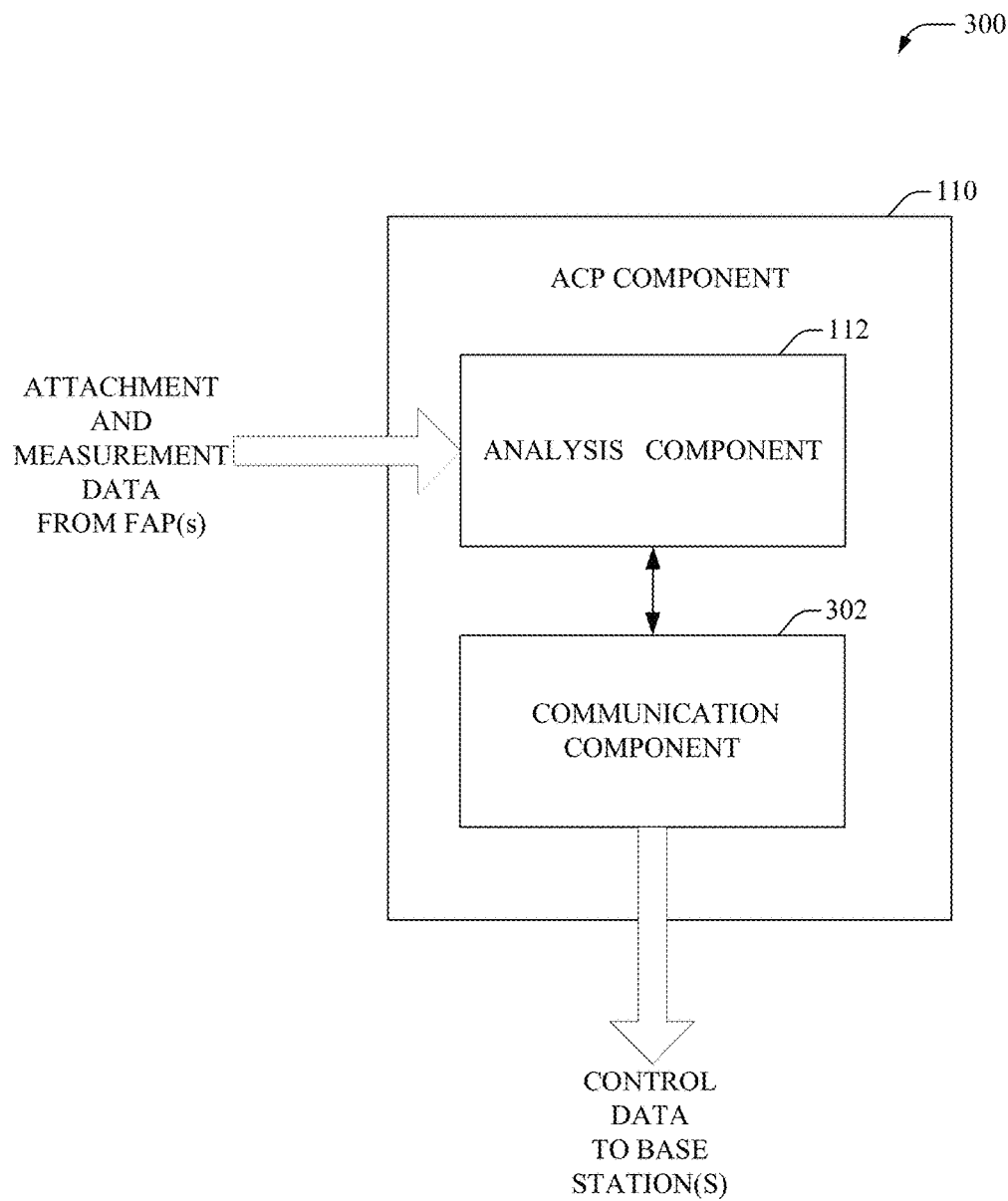
FIG. 3 illustrates an example system that leverages measurements obtained by a FAP to improve macro network coverage in a location with a high concentration of users.

Referring now to FIG. 3, there illustrated is an example system 300 that leverages measurements obtained by a FAP 102 to improve macro network coverage in a location with a high concentration of users. Moreover, system 300 provides a relatively simple and inexpensive approach to dynamically tune/steer antenna beams towards UE swarms and provide better macro coverage in swarm locations, based on real-time femto measurements. In other words, system 300 leverages the location-specific-awareness attributes of FAPs to improve the adaptability and capacity of macro access points comprising relatively simple and inexpensive beam-steering antennas. Moreover, the system 300 can utilize femto attachment attempt data to quantify and locate concentrations of idle-mode UEs, before the UEs initiate communication (e.g., prior to the UE making a call). The ACP component 110 and the analysis component 112 can include functionality, as more fully described herein, for example, with regard to systems 100 and 200.

According to an embodiment, the analysis component 112 can receive attachment attempt data measured/collected by FAP(s) deployed in various locations, for example, within venues where swarms are likely to occur, such as, but not limited to, stadiums, theatres, concert arenas, fair grounds, shopping malls, etc. As an example, FAP(s), connected to the venue DSL facilities, can be relatively low capacity and cost. Moreover, the FAP(s) generally provide access to an authorized list of users (e.g., venue employees). However, whilst idle, nearby visitor UEs can still attempt to attach to the FAP(s). Attachment attempts can occur more often in dense user areas, and less often in isolated areas, thus providing the analysis component 112 with an indicator of user density and migration, for example, within the relatively small radius of the respective FAP(s).

The analysis component 112 can utilize the attachment attempt data to localize, predict and/or weigh the potential wireless data traffic within and between venues. Measurements from FAP(s) with a greater number of attachment attempts can have more result weighting contribution than measurements taken from FAP(s) with less attachment attempts. Additionally, or optionally, the analysis component 112 can also assign weights to FAP(s) based on the type of UEs attempting to access the FAP(s). For example, an attachment attempt made by a visitor UE (e.g., unauthorized to access the FAP) can be employed to provide a higher weighting contribution than an attachment attempt made by a whitelisted UE (e.g., unauthorized to access the FAP); since the white listed UE can utilize femto resources for communication. Further, in one example, if the number of whitelisted UEs trying to attach to a FAP is greater than the capacity of the FAP, the attachment attempt made by the whitelisted UE can provide a weighting contribution that equals the weighting contribution provided by a visitor UE. Furthermore, number of attachment attempts made by unique UEs at different FAPs can also be compared by the analysis component 112 to accurately identify areas of high user density/concentration. It can be appreciated that the subject system is not limited to the above examples for weighting contribution and most any policy (e.g., specified by the service provider/operator) for assigning weights to FAPs based on attachment attempt data can be utilized. Moreover, the weighting can ensure that automatic antenna tuning algorithms benefit the highest concentrations of users.

In one aspect, the analysis component 112 can evaluate the attachment attempt data to quantify and locate concentrations of idle-mode users before they make calls. In addition, the analysis component 112 can also receive data indicative of macro radio conditions surrounding the FAP(s). As an example, the FAP(s) can report data indicative of a macro cell site(s) providing the strongest signal at the FAP(s) location. The analysis component 112 can utilize the strongest macro cell site information to determine which macro sectors can or should serve the UEs in the FAP(s) location. Further, the analysis component 112 can identify and/or select an optimal macro sector, antenna bearing and/or tilt suited for the highest user concentration locations reported by the FAP(s).

Additionally, the ACP component 110 can include a communication component 302 that can transmit/deliver instructions to one or more macro access points identified/selected by the analysis component 112 for beam steering, for example, by changing bearing and/or tilt, of their antennas towards the areas of highest user density. As an example, the macro access points can utilize various beam forming and steering techniques, such as, but not limited to, a delay-and-sum scheme, a null-steering scheme, a frequency domain scheme, etc. Most often, a phased array antenna can be utilized within the macro access point, which can include one or more radiating elements, each having a phase shifter. Moreover, beams can be formed by shifting the phase of the signal emitted from each radiating element, to provide constructive/destructive interference to steer the beams in the targeted direction. In one example, after adjustment the antenna beams can be steered back to an original or default position/direction, for example, on expiration of a predefined time period, on detection (e.g., by the analysis component) that the swarm condition no longer exists (e.g., by analysis of the FAP-reported data), and/or on detection (e.g., by the analysis component) that the swarm location has changed (e.g., by analysis of the FAP-reported data)

The analysis and evaluation, by the analysis component 112, can be repeated and/or updated each time FAP-reported user density changes. In addition, the analysis component 112 can also track or detect motion of a swarm. For example, if a first FAP reports access attempts by a set of UEs (e.g., identified by IMSIs, IMEIs, MSISDNs, SIMs and/or serial numbers) that were previously detected at and reported by a second FAP, the analysis component 112 can ascertain that the swarm has moved from the location of the second FAP to that of the first FAP. Accordingly, the analysis component 112 can generate instructions/commands, and/or specify parameter values, for redirecting macro cell antennas from the location of the second FAP to that of the first FAP, and the communication component 302 can deliver the instructions/commands/parameter values to the appropriate macro access points, for example, via a macro network platform.

In other words, the analysis component 112 can: receive data from one or more FAPs reporting high concentration of attachment attempts; consolidate, aggregate, analyze and/or evaluate the data to identify swarm location(s) and serving macro sector(s); identify and/or select optimal macro site(s) and antenna steering parameters, to focus upon the swarm area; facilitate tuning and/or steering of antenna beams towards swarms; and/or facilitating reconfiguration or redirection of antenna beams, as reported swarm concentrations shift between FAPs. Accordingly, system 300 provides a flexible and cost effective system for real-time and event driven, macro beam tuning/steering. Moreover, due to the relatively small and focused area of FAP coverage, simple antennas with high gain (and narrow beams) capable of penetrating buildings without creating excessive system interference and nulls can be utilized at macro cell sites.

Figure 4A:
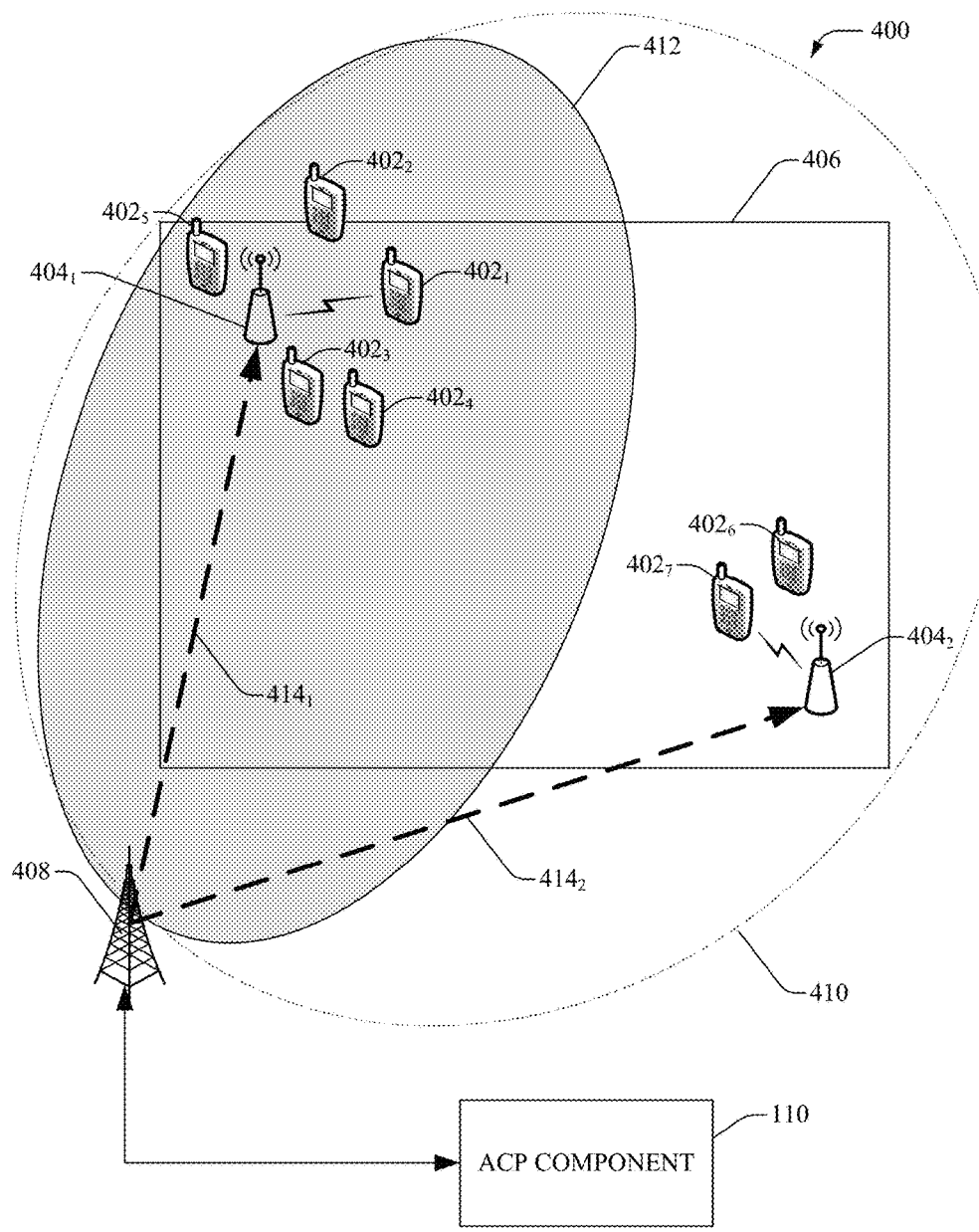
FIGS. 4A-B illustrate example systems that can detect location and movement of UE swarms.

FIG. 4A illustrates an example system 400 that can locate UE swarms within a femtocell coverage area, according to an aspect of the subject disclosure. Typically, one or more femtocells can be deployed within a macro cell, served by a base station 408. Although only two femtocells, served by their respective FAPs 404₁-404₂ are illustrated, it can be appreciated that the subject disclosure is not that limited and most any number of femtocells can be deployed within the macro cell and/or macro network. Moreover, the FAPs 404₁-404₂ can be substantially similar to FAP 102 and can include functionality, as more fully described herein, for example, with regard to systems 100-200. Further, the base station 408 can be substantially similar to base station 104 and can include functionality, as more fully described herein, for example, with regard to systems 100-200. Furthermore, the ACP component 110 can include functionality, as more fully described herein, for example, with regard to systems 100-300.

In one aspect, FAPs 404₁-404₂ can collect, record, and/or compute (e.g., by employing the attachment detection component 202), a number of attachment attempts made by UEs (402₁-404₇) within a specific time period. Although only seven UEs (402₁-404₇) are illustrated, it can be appreciated that the subject disclosure is not that limited and a greater or lesser number of UEs can be present within the femtocell coverage areas. As an example, UEs can be whitelisted (402₁, 402₇) or can be visitors (402₂-402₆). It can be appreciated that the UEs (402₁-404₇) disclosed herein can include most any electronic communication device, such as, but not limited to, a cell phone, a tablet, a digital media player, a gaming console, a digital camera, a video recorder, a PDA, a personal computer, laptop, etc. During an idle mode (e.g., before initiating a voice call), UEs (402₁-404₇) can attempt to attach to nearby FAPs 404₁-404₂. The FAPs 404₁-404₂ can report the number of attachment attempts made during a specific time period to the ACP component 110, for example, via a femto network platform (not shown). In this example scenario, FAP 404₁ can detect and report a high traffic area with a greater number of attachment attempts from UEs 402₁-404₅; while FAP 404₂ can detect a lower number of attachment attempts by UEs 402₆-404₇.

In addition, at a scheduled time or during an idle period, FAPs 404₁-404₂ can monitor (414₁, 414₂) their surrounding radio conditions (e.g., by employing respective measurement components 212), for example, by performing a network listen procedure. In one example, FAPs 404₁-404₂ can be configured to notify the ACP component 110 of a macro base station providing the strongest/optimal signal at the FAPs 404₁-404₂. In one aspect, the FAPs 404₁-404₂ can transfer data (e.g., measurement and/or attachment attempt data) to the ACP component 110 in real-time or at a specific time, for example, when the femtocell is idle, periodically, on demand (e.g., polling), etc.

According to an embodiment, the ACP component 110 can collect, aggregate and/or consolidate reports (e.g., including measurement and/or attachment attempt data) received from FAPs 404₁-404₂, which are neighboring the same macro sector. Further, the ACP component 110 can identify optimal antenna bearing for the higher UE concentration area (e.g., by employing the analysis component 112) and deliver an update to the macro base station 408 (e.g., by employing the communication component 302). The macro base station 408 can comprises antenna array(s) that serve a fixed coverage layer 410, including a steerable capacity layer 412. Moreover, on receiving the update from the ACP component 110, the macro base station 408 can direct the antenna array(s) to focus towards the higher concentration of UEs. In other words, the antenna beam transmitted by macro base station 408 can be focused on and/or directed towards the femtocell coverage area of FAP 404₁.

Figure 4B:
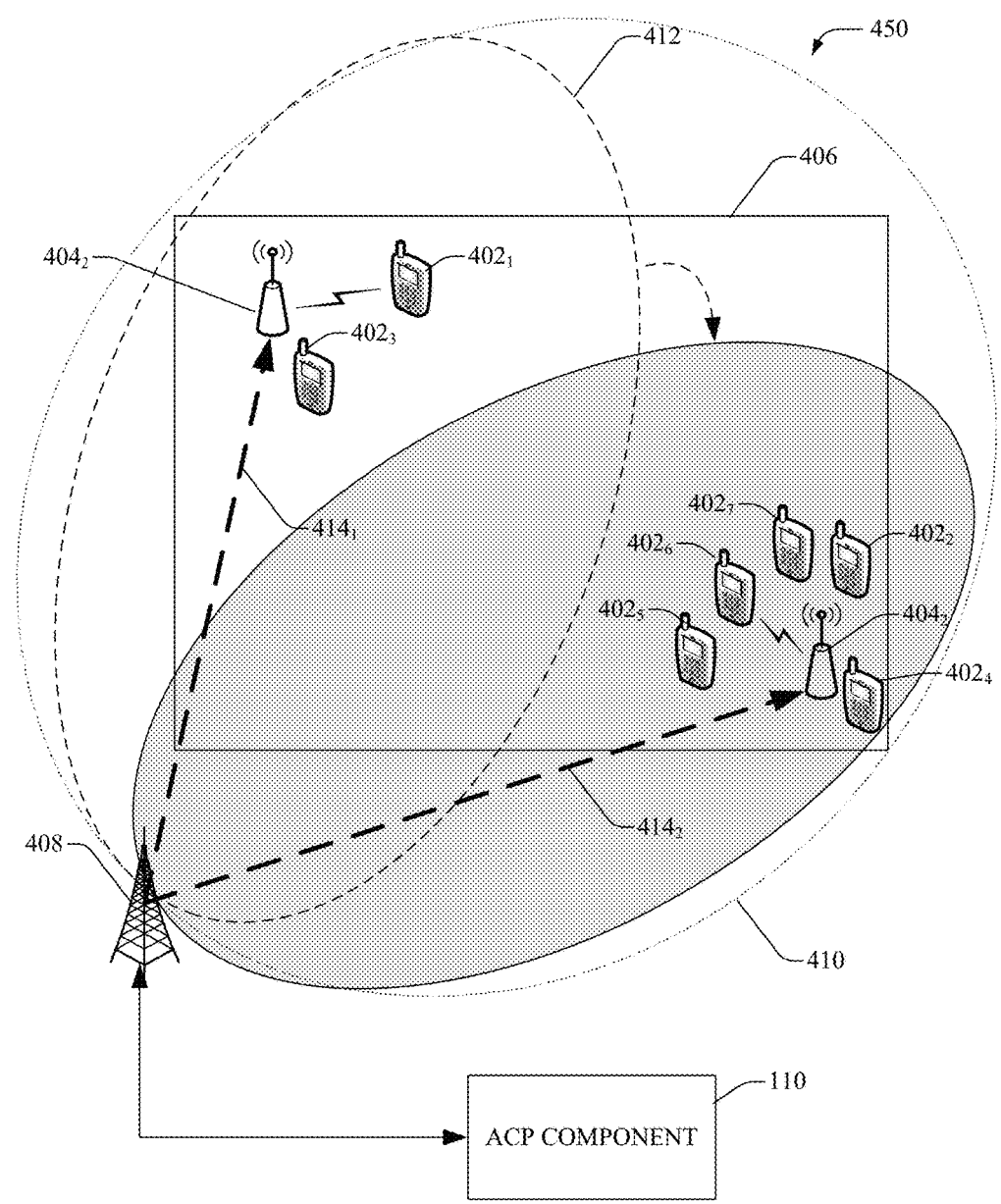

Referring now to FIG. 4B, there illustrated is an example system 450 that can detect swarm movement and can accordingly provide macro beam adjustment. Continuing with the example scenario disclosed above, the FAPs 404₁-404₂ can continue to update UE density changes, based on the number of attachment attempts, and report the updates to the ACP component 110, via the femto network platform (not shown). Moreover, the swarm can move from one location to another, causing UE density changes. For example, a group of users can move from a conference room to a restaurant in a convention center, after a meeting. In another example, a set of users can move from a parking lot (e.g., during a tail gating party) to a stadium, when the game begins. As seen from FIG. 4B, UEs 402₂, 4024, and 404₅, move from the femtocell coverage area of FAP 404₁ to that of FAP 404₂. Accordingly, FAP 404₂ can now report a higher number of attachment attempts than FAP 404₁. Additionally, or optionally, the ACP component 110 can receive identifiers (e.g., IMSIs, IMEIs, MSISDNs, SIMs, serial numbers, etc.) associated with the UEs attempting to connect with the FAP 404₁. Accordingly, the ACP component 110 can determine that the UEs (402₂, 4024, and 404₅), previously detected at and reported by FAP 404₁, have moved to the coverage area of FAP 404₂. In other words, the ACP component 110 (e.g., by employing the analysis component 112) can ascertain/detect movement of the swarm from the coverage area of FAP 404₁ to that of FAP 404₂. Moreover, the ACP component 110 (e.g., by employing the communication component 302) can deliver updated instructions/parameters to the base station 408 that facilitate adjustment of the antenna beam towards the femtocell coverage area of the FAP 404₂. Accordingly, the macro base station 408 can re-direct the antenna array(s) to focus towards the femtocell coverage area of the FAP 404₂ to better serve and improve macro network coverage for the higher concentration of UEs.

Figure 5:
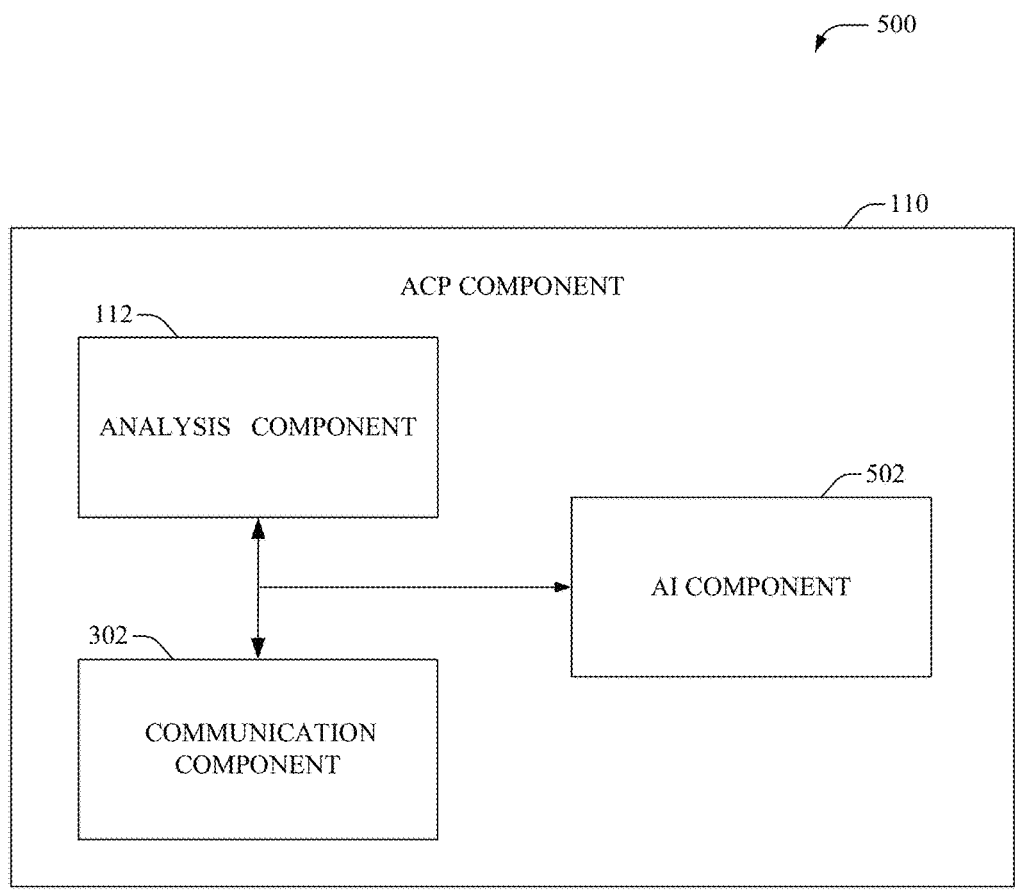
FIG. 5 illustrates an example system that facilitates automating one or more features in accordance with the subject disclosure.

Referring now to FIG. 5, there illustrated is an example system 500 that employs an artificial intelligence (AI) component 502, which facilitates automating one or more features in accordance with the subject embodiments. It can be appreciated that the ACP component 110, the analysis component 112, and the communication component 302 can include respective functionality, as more fully described herein, for example, with regard to systems 100-450.

An example embodiment, system 500 (e.g., in connection with automatically identifying swarm locations and/or optimal beam steering parameters) can employ various AI-based schemes for carrying out various aspects thereof. For example, a process for determining a location of a swarm, motion of the swarm, optimal parameters to steer an antenna beam of a macro access point, etc., can be facilitated via an automatic classifier system and process. Moreover, the classifier can be employed to determine a femtocell location that has a high UE density, a macro base station that can best serve the determined femtocell location, etc. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information received from FAPs, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, FAP reports, operator preferences, historical information, receiving extrinsic information). For example, SVM's are configured via a learning or training phase within a classifier constructor and feature selection module. Thus, the classifier(s) can be used to automatically learn and perform a number of functions, including but not limited to determining according to a predetermined criterion a location and motion of a swarm of UEs (e.g., in real-time), one or more macro access point that can best serve the swarm location, parameters (e.g., antenna bearing, tilt, phase, etc.) for steering a macro antenna beam, etc. The criteria can include, but is not limited to, historical patterns, UE behavior, user preferences, service provider preferences and/or policies, FAP parameters/reports, location of the femtocell, location of the macro sites, etc.

Figure 6:
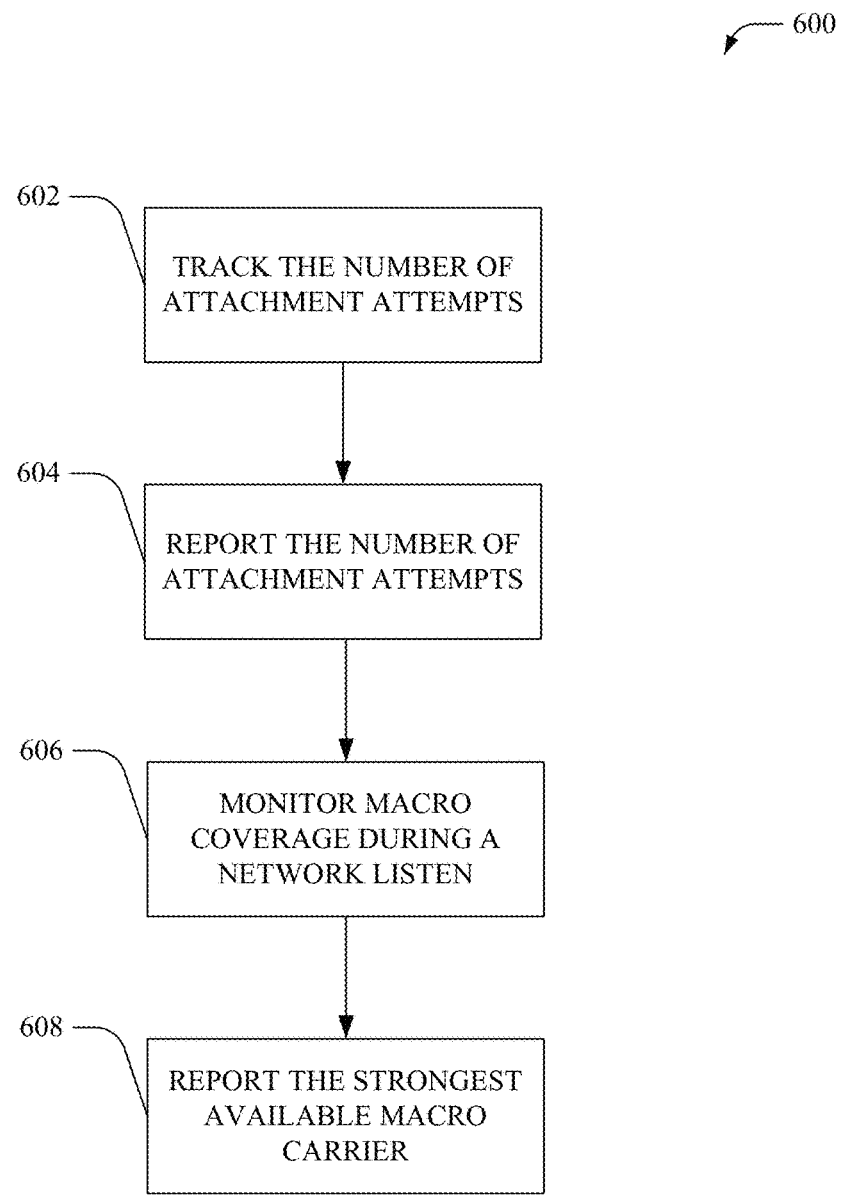
FIG. 6 illustrates an example methodology that that can be utilized to report femto attachment and measurement data.
Figure 7:
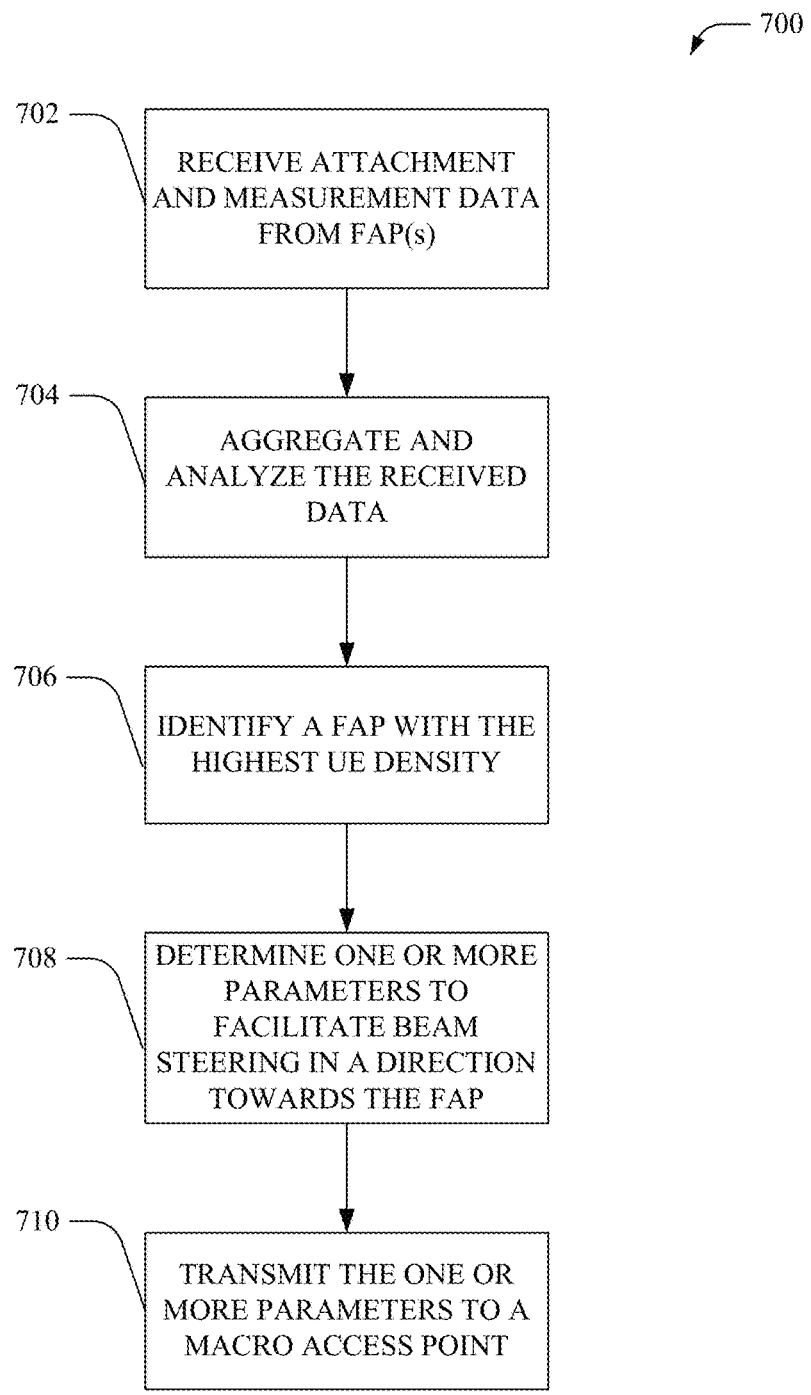
FIG. 7 illustrates an example methodology that can facilitate macro beam steering based on femto measurements.
Figure 8:
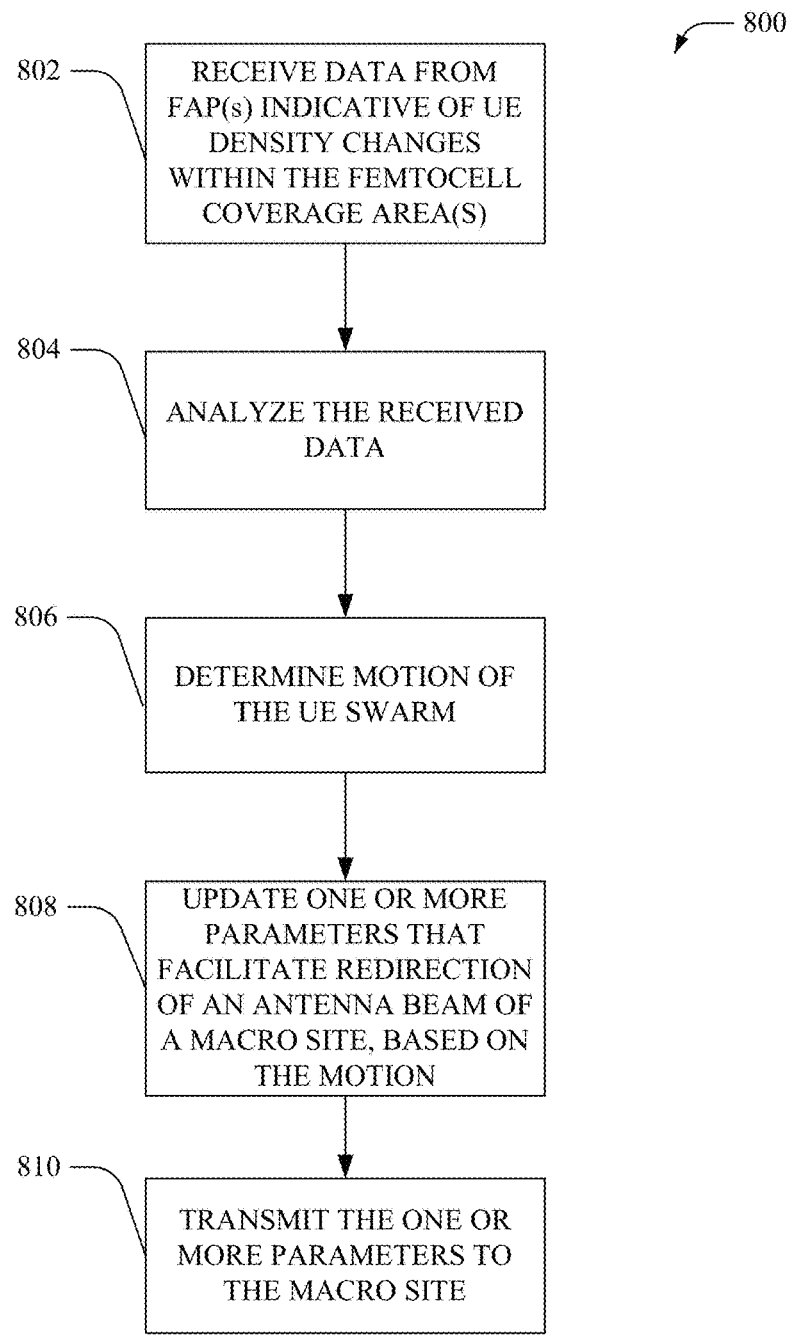
FIG. 8 illustrates an example methodology that facilitates determining motion of a user swarm based on femto attachment measurements.

FIGS. 6-8 illustrate methodologies and/or flow diagrams in accordance with the disclosed subject matter. For simplicity of explanation, the methodologies are depicted and described as a series of acts. It is to be understood and appreciated that the subject specification is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 6, illustrated is an example methodology 600 that can be utilized to report femto attachment and measurement data, according to an aspect of the subject specification. A large number of FAPs are being deployed in the cellular network to improve indoor coverage and offload a mobility RAN. The location of each FAP is known at the time of activation and/or installation. This location data can be leveraged to identify a location of a swarm of UEs, based on a number of attachment attempts made at the FAPs. This can enable dynamic and efficient macro beam steering and improve macro network quality perceived by the UEs within the swarm.

In one aspect, at 602, the number of attachment attempts made by UE(s) to connect to a FAP can be tracked, for example, over a specified period of time. Additionally, or optionally, the number unique devices attempting to attach to the FAP can also be identified, for example, based on an IMSI number of the device. Further, the number of whitelisted, blacklisted, and visitor UEs, attempting to camp on the FAP, can also be determined. At 604, the number of attachment attempts to the FAP within the specified amount of time can be reported (e.g., to an ACP component 110). The number of attachment attempts provides a gauge for estimating a number of subscribers that will benefit, if macro coverage is improved at the location of the FAP.

In addition, at 606, macro coverage, at the FAP, can be monitored, for example, by performing a network listen procedure. In one example, signal parameters such as, but not limited to, signal strength of a transmission from macro base station(s), can be detected and compared to identify the strongest available macro carrier. At 608, the strongest available macro carrier can be reported (e.g., to an ACP component 110).

FIG. 7 illustrates an example methodology 700 that can facilitate macro beam steering based on femto measurements in accordance with an aspect of the subject specification. In particular, methodology 700 can facilitate detection and/or location of UE swarms. At 702, attachment and measurement data can be received from FAPs, for example, that can be neighboring, surrounding, or within a predefined distance from one or more macro sites. As an example, the attachment data can include a total number of attachment attempts, a number of attachment attempts made by whitelisted UEs, a number of attachment attempts made by blacklisted UEs, and/or a number of attachment attempts made by visitor UEs, to connect with a FAP. Further, the measurement data can be indicative of the strongest available macro carrier at a FAP location. At 704, the received data can be aggregated/consolidated and analyzed. In one aspect, the analysis can include weighing the FAPs based on attachment data. As an example, a FAP reporting a higher number of attachment attempts can be assigned a higher weight than a FAP reporting a lower number of attachment attempts.

Based on the analysis, at 706, a FAP with the highest UE density (e.g., swarm) can be identified. Moreover, since the location of the FAP is known (e.g., based on GPS coordinates or user input), a location of a swarm can be determined. At 708, one or more parameters (e.g., antenna bearing and/or tilt) can be determined to facilitate beam steering, of an antenna(s) at a macro access point, in a direction towards the location of the FAP. Moreover, at 710, the one or more parameters can be transmitted to the macro access point, which in turn can steer its antenna beam to overlap the femtocell coverage area of the FAP and improve macro coverage for the UEs within the swarm.

FIG. 8 illustrates an example methodology 800 that facilitates determining motion of a swarm based on femto attachment measurements, according to an aspect of the subject disclosure. Moreover, methodology 800 can utilize real time measurement data representing actual (not predicted) UE density based on femto measurements, such that macro coverage for high UE density areas can be dynamically improved. At 802, data from FAP(s) indicative of UE density changes, within their respective femtocell coverage areas, can be received. At 804, the received data can be analyzed. As an example, weights assigned to FAPs can be re-evaluated and/or updated to re-select a FAP with the highest concentration of UEs. In other words, a new/updated location of a UE swarm can be identified. Moreover, at 806, motion of the UE swarm can be determined, for example, based on the analysis and/or previously reported attachment data (e.g., by the FAP(s)). Further, at 808, one or more parameters that facilitate redirection of an antenna beam of a macro site can be updated, based on the motion/movement of the swarm. At 810, the one or more updated parameters can be transmitted to the macro site. Accordingly, the macro site can redirect and/or update the direction towards which its antenna beam is focused. In one example, the antenna beam can be redirected to overlap the coverage area of the FAP with the highest concentration of UEs.

Figure 9:
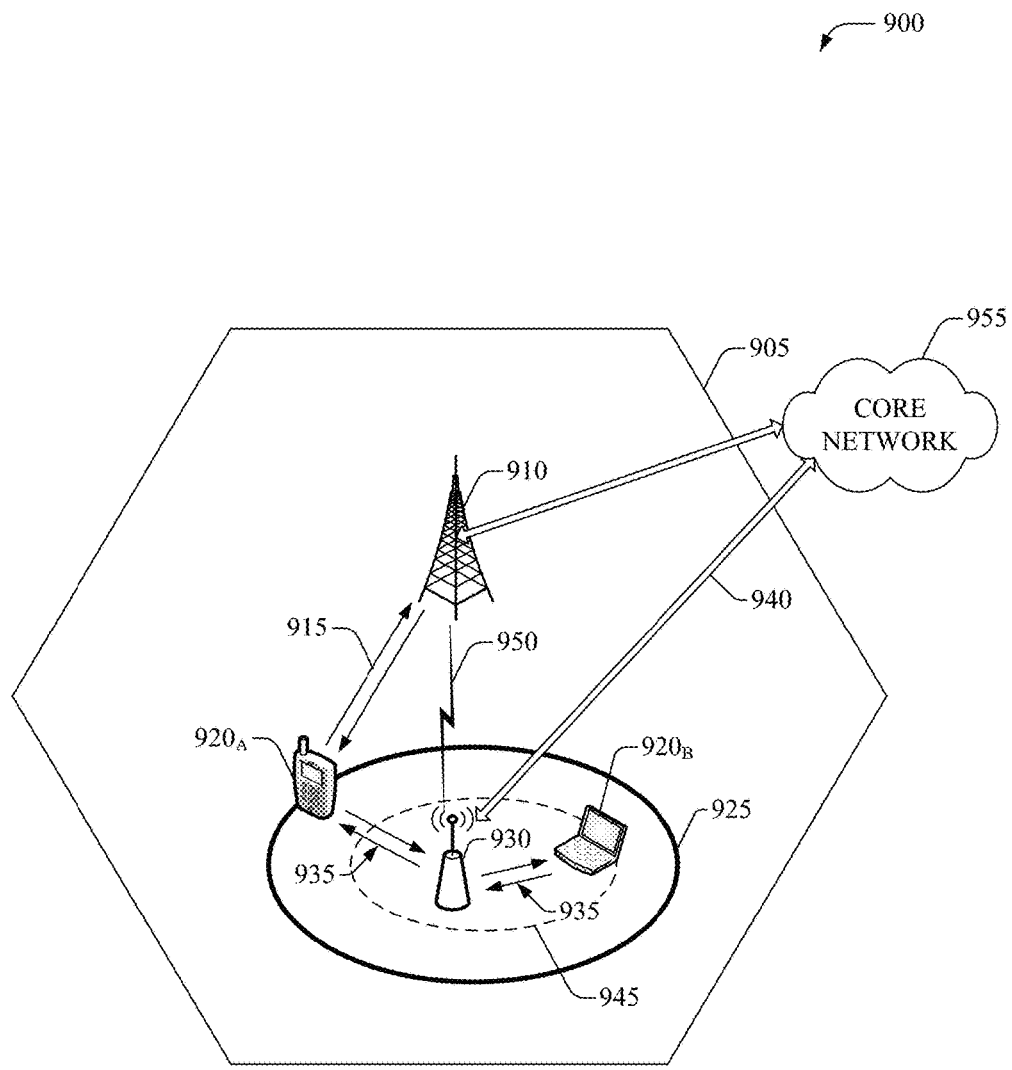
FIG. 9 illustrates an example wireless communication environment with associated components for operation of a femtocell in accordance with the subject specification.

FIG. 9 illustrates a schematic wireless environment 900 (e.g., a network) in which a femtocell can exploit various aspects of the subject specification in accordance with the disclosed subject matter. In wireless environment 900, area 905 can represent coverage macro cell, which can be served by base station 910. Macro coverage is generally intended for outdoors locations for servicing mobile wireless devices, like UE 920$_A$, and such coverage is achieved via a wireless link 915. In an aspect, UE 920 can be a 3GPP Universal Mobile Telecommunication System (UMTS) mobile phone.

Within macro coverage cell 905, a femtocell 945, served by a femto access point 930, can be deployed. A femtocell typically can cover an area 925 that is determined, at least in part, by transmission power allocated to FAP 930, path loss, shadowing, and so forth. Coverage area typically can be spanned by a coverage radius that ranges from 20 to 50 meters. Confined coverage area 945 is generally associated with an indoors area, or a building, which can span about 5000 sq. ft. Generally, FAP 930 typically can service a number (e.g., a few or more) wireless devices (e.g., subscriber station 920$_B$) within confined coverage area 945. In an aspect, FAP 930 can integrate seamlessly with substantially any PS-based and CS-based network; for instance, FAP 930 can integrate into an existing 3GPP Core via conventional interfaces like Iu-CS, Iu-PS, Gi, Gn. In another aspect, FAP 930 can exploit high-speed downlink packet access in order to accomplish substantive bitrates. In yet another aspect, FAP 930 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 920$_A$, can leave macro coverage (e.g., cell 905) and enters femtocell coverage (e.g., area 925), as illustrated in environment 900. A carrier frequency scan can be triggered by the UE 920$_A$, which can detect the FAP 930. UE 920$_A$ can attempt to attach to the FAP 930 through transmission and reception of attachment signaling, effected via a FL/RL 935; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 920 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 930) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 920 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful, UE 920 can be allowed on femtocell 925 and incoming voice and data traffic can be paged and routed to the subscriber station through the FAP 930. It is to be noted also that data traffic is typically routed through a backhaul broadband wired network backbone 940 (e.g., optical fiber backbone, twisted-pair line, T1/E1 phone line, DSL, or coaxial cable). It is to be noted that as a FAP 930 generally can rely on a backhaul network backbone 940 for routing and paging, and for packet communication, substantially any quality of service can handle heterogeneous packetized traffic. Namely, packet flows established for wireless communication devices (e.g., terminals 920$_A$ and 920$_B$) served by FAP 930, and for devices served through the backhaul network pipe 940. It is to be noted that to ensure a positive subscriber experience, or perception, it is desirable for FAP 930 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femtocell coverage area (e.g., area 925 or area 945).

Figure 10:
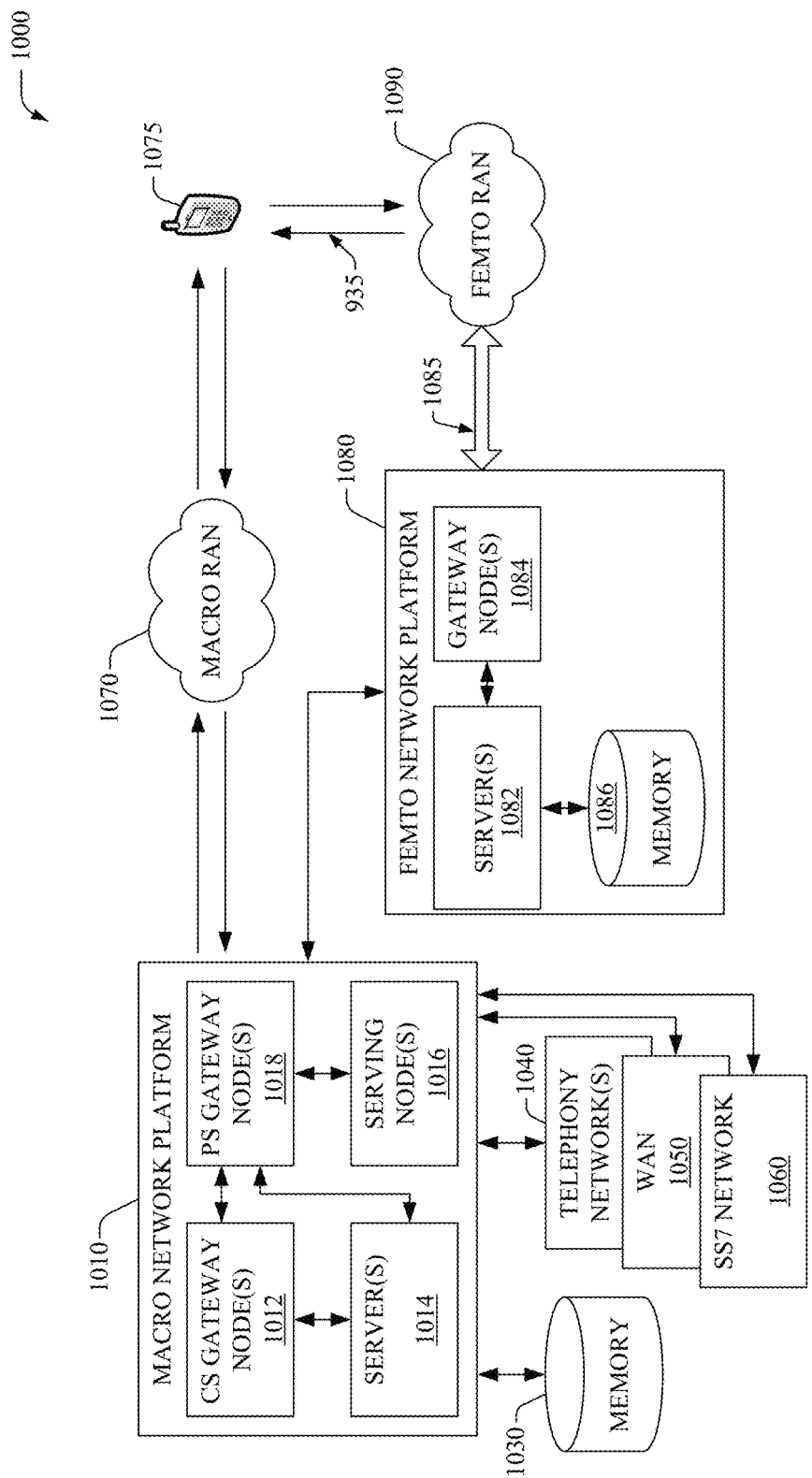
FIG. 10 illustrates a schematic deployment of a macro cell and a femtocell for wireless coverage in accordance with aspects of the disclosure.
Figure 11:
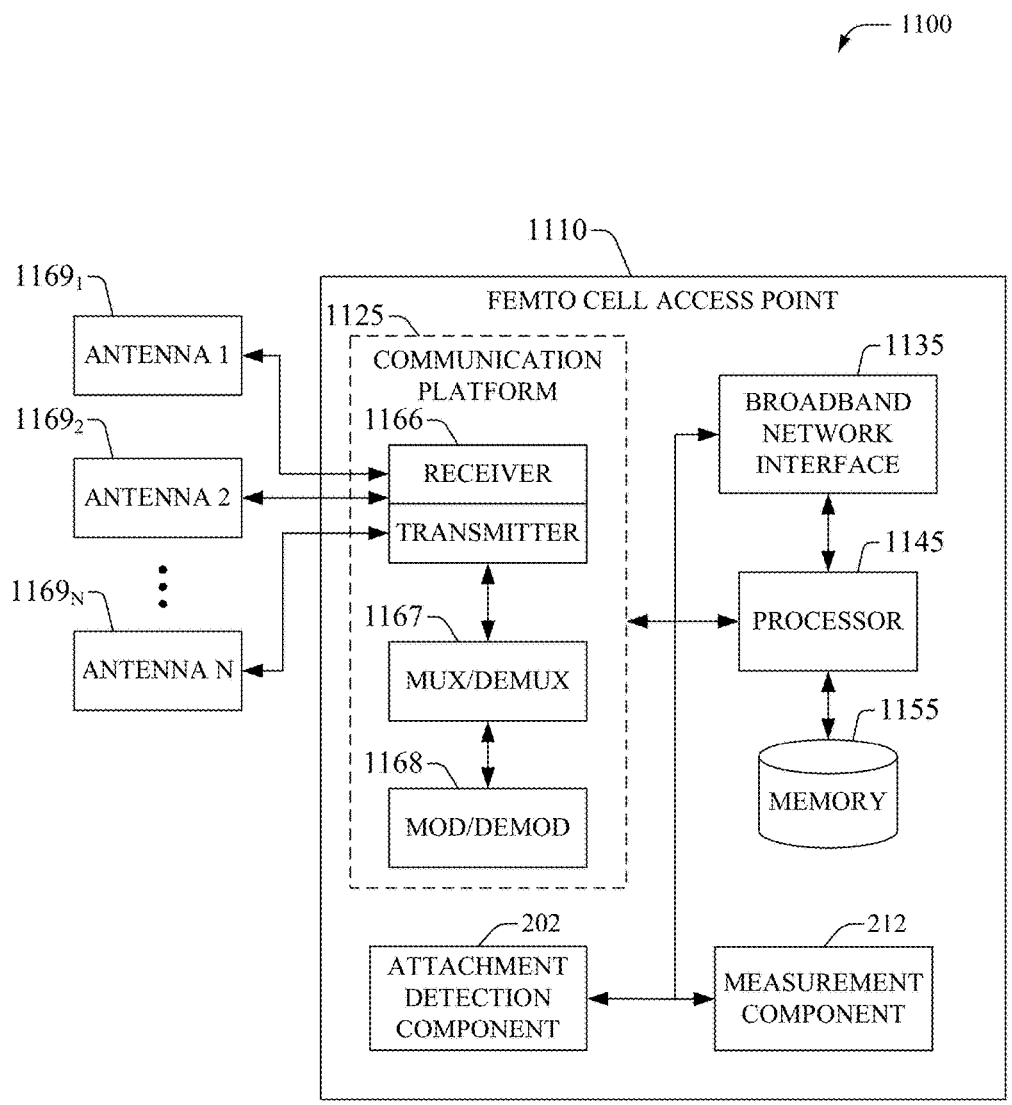
FIG. 11 illustrates an example embodiment of a femto access point that can report femto measurements to facilitate improvement in macro coverage in swarm locations, according to the subject disclosure.

To provide further context for various aspects of the subject specification, FIGS. 10 and 11 illustrate, respectively, an example wireless communication environment 1000, with associated components for operation of a femtocell, and a block diagram of an example embodiment 1100 of a femto access point, which can facilitate swarm detection by reporting femto measurements in accordance with aspects described herein.

Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 940. It should be appreciated that femto network platform 1080 typically offloads UE 1075 from macro network, once UE 1075 attaches (e.g., through macro-to-femto handover, or via a scan of channel resources in an idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 905, while femto RAN 1090 can comprise multiple femtocell access points. As mentioned above, it is to be appreciated that deployment density in femto RAN 1090 is substantially higher than in macro RAN 1070.

Generally, both macro and femto network platforms 1010 and 1080 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Moreover, CS gateway node(s) 1012 interfaces CS-based traffic and signaling and gateway node(s) 1018.

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. It should be further appreciated that the packetized communication can include multiple flows that can be generated through server(s) 1014. Macro network platform 1010 also includes serving node(s) 1016 that conveys the various packetized flows of information, or data streams, received through gateway node(s) 1018. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Server(s) 1082 have substantially the same functionality as described in connection with server(s) 1014 and can include one or more processors configured to confer at least in part the functionality of macro network platform 1010. Moreover, the ACP component 110 can be implemented or executed by server(s) 1082 and/or server(s) 1014. To that end, the one or more processor can execute code instructions stored in memory 1086, for example.

Memory 1086 can include information relevant to operation of the various components of femto network platform 1080. For example, operational information that can be stored in memory 1086 can comprise, but is not limited to, subscriber information; contracted services; maintenance and service records; femtocell configuration (e.g., devices served through femto RAN 1090; access control lists, or white lists); service policies and specifications; privacy policies; add-on features; femto measurement data, and so forth With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1110 also includes a processor 1145 configured to confer functionality, at least partially, to substantially any electronic component in the femto access point 1110, in accordance with aspects of the subject disclosure. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas $1169_1$-$1169_N$ to facilitate beamforming or selective radiation pattern formation, which can benefit specific locations (e.g., basement, home office . . . ) covered by FAP; and exploit substantially any other advantages associated with smart-antenna technology. Memory 1155 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access lists (e.g., white lists); license(s) for utilization of add-features for FAP 1110, and so forth. In one example, data store 206 can be implemented in memory 1155.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. The FAP 1110 can further include an attachment detection component 202 and measurement component 212, which can include functionality, as more fully described herein, for example, with regard to systems 200. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
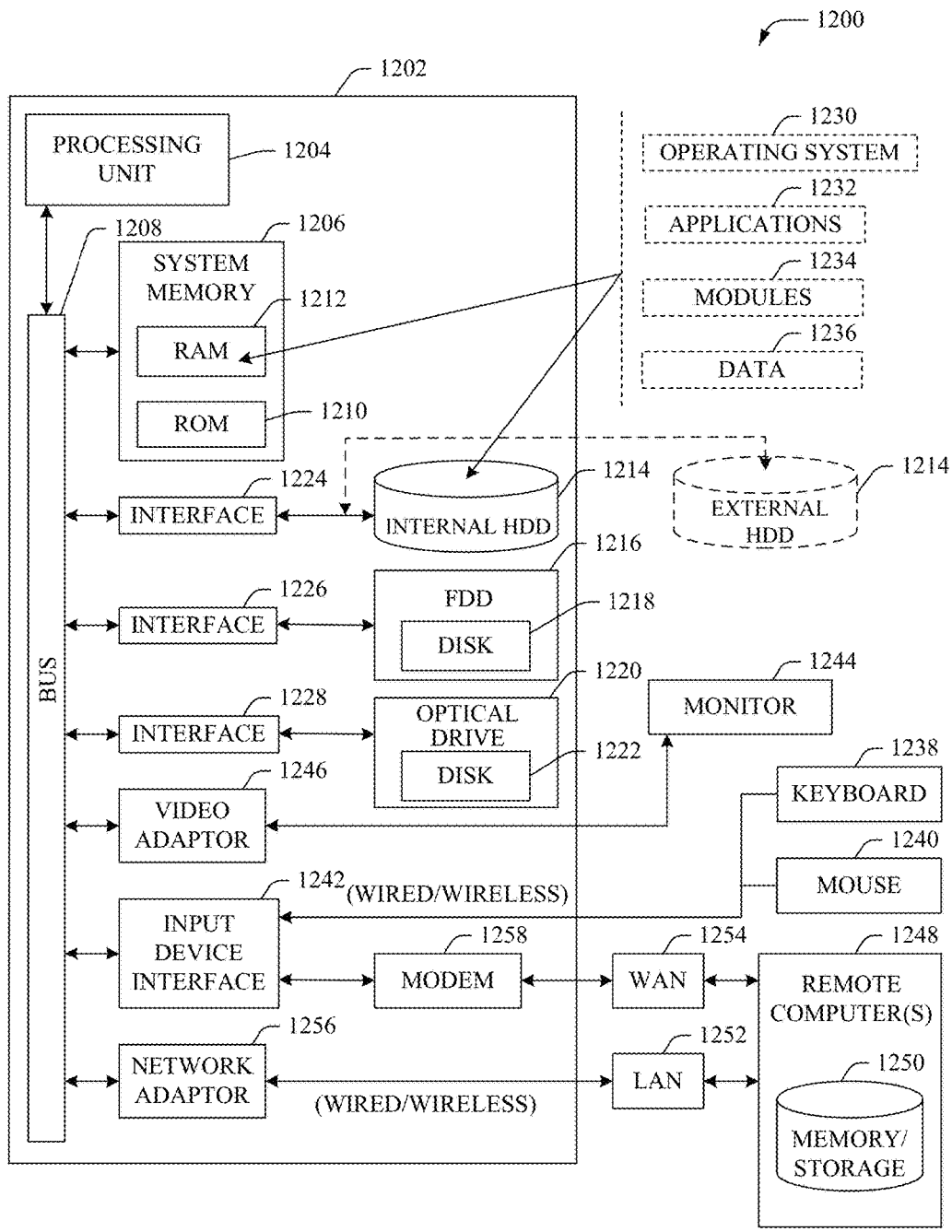
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   based on frequency data indicative of a frequency of requests for access to a first access point device of a network during a specified time period, facilitating steering of a direction of an antenna beam of an antenna of a second access point device of the network, towards an area associated with the first access point device, and
   subsequent to the steering and in response to receiving authorization data from a user identity associated with the first access point device, facilitating a measurement of a radio environment of the first access point device, wherein the authorization data allows the measurement.

2. The system of claim 1, wherein the facilitating the steering comprises facilitating the steering in response to determining that the frequency data satisfies a high frequency criterion.

3. The system of claim 1, wherein the facilitating the steering comprises facilitating a modification of relative phases of radio frequency signals that drive antenna elements of the antenna.

4. The system of claim 1, wherein the frequency data comprises information indicative of a number of attachment attempts made by user equipment that have been authorized to access the first access point device.

5. The system of claim 1, wherein the frequency data comprises information indicative of a number of attachment attempts made by user equipment that have been prohibited from accessing the first access point device.

6. The system of claim 1, wherein the frequency data is determined based on identifier data indicative of respective identifiers of user equipment that have transmitted the requests.

7. The system of claim 1, wherein the facilitating the measurement comprises facilitating a determination of a strength of a signal transmitted via the second access point device.

8. The system of claim 1, wherein the facilitating the measurement comprises facilitating a determination of a downlink rate of a signal transmitted via the second access point device.

9. The system of claim 1, wherein the facilitating the measurement results in generation of measurement data and the operations further comprise:
   storing the measurement data within a data store associated with the first access point device.

10. The system of claim 1, wherein a bearing of the antenna is updated to facilitate the steering.

11. The system of claim 1, wherein a parameter associated with a tilt of the antenna is updated to facilitate the steering.

12. The system of claim 1, wherein the first access point device is a femto access point device and the second access point device is a macro access point device that is determined to be located within a defined distance from the femto access point device.

13. The system of claim 1, wherein the second access point device is selected based on determining that a strength of a carrier signal of the second access point device satisfies a defined signal strength criterion.

14. A method, comprising:
   aggregating, by a system comprising a processor, frequency data provided by femto access point devices of a network, wherein the frequency data is indicative of a frequency of requests for access to the respective femto access point devices during a specified time period, and wherein the aggregating results in aggregated frequency data;
   based on analyzing the aggregated frequency data, facilitating, by the system, a steering of a direction of an antenna beam of an antenna of a macro access point device of the network, the steering being towards an area associated with the femto access point devices; and
   subsequent to the steering and in response to receiving authorization data from a user identity associated with a femto access point device of the femto access point devices, facilitating, by the system, a measurement of a radio environment of the femto access point device.

15. The method of claim 14, further comprising:
   verifying, by the system, that a signal strength of a signal transmitted by the macro access point device has increased as a function of the steering.

16. The method of claim 15, further comprising:
   providing, by the system, feedback data to a network device of the network, wherein the feedback data is indicative of an increase in the signal strength.

17. A non-transitory machine-readable storage medium, comprising executable instructions that, when executed by a processor, facilitate performance of operations, comprising:
   analyzing aggregated frequency data that has been received from femto access point devices of a network, wherein the aggregated frequency data is indicative of a frequency of requests for access to the respective femto access point devices during a defined time period;
   based on the analyzing, facilitating a steering of a direction of an antenna beam of an antenna of a macro access point device of the network, the direction of the antenna beam being steered towards an area associated with the femto access point devices; and
   subsequent to the steering and based on verifying that authorization data has been received from a subscriber identity associated with a femto access point device of the femto access point devices, facilitating a measurement of a radio environment of the femto access point device.

18. The non-transitory machine-readable storage medium of claim 17, wherein the analyzing comprises analyzing the aggregated frequency data based on weighting data assigned to the femto access point devices.

19. The non-transitory machine-readable storage medium of claim 18, wherein the aggregated frequency data comprises information indicative of a number of attachment attempts made by user equipment that have been authorized to access the femto access point devices.

20. The non-transitory machine-readable storage medium of claim 18, wherein the aggregated frequency data comprises information indicative of a number of attachment attempts made by user equipment that have been prohibited from accessing the femto access point devices.

\* \* \* \* \*